United States Patent [19]

Kuhlmann

[11] 4,413,936

[45] Nov. 8, 1983

[54] CONTROL DEVICE IN A MACHINE TOOL

[75] Inventor: Gerhard Kuhlmann, Stuttgart, Fed. Rep. of Germany

[73] Assignee: Robert Bosch GmbH, Stuttgart, Fed. Rep. of Germany

[21] Appl. No.: 199,106

[22] Filed: Oct. 20, 1980

[30] Foreign Application Priority Data

Oct. 27, 1979 [DE] Fed. Rep. of Germany ....... 2943508

[51] Int. Cl.³ .................. B23B 45/00; B23B 47/00
[52] U.S. Cl. .................................. 408/8; 173/11; 173/170; 409/188
[58] Field of Search .............. 409/231, 232, 234, 188; 408/8, 9; 173/10, 11, 170; 279/1 E, 1 ME, 19.1, 19.2, 33

[56] References Cited

U.S. PATENT DOCUMENTS

| 2,796,161 | 6/1957 | Graybill | 408/9 X |
| 3,143,900 | 8/1964 | Deckl et al. | 408/8 X |
| 3,161,242 | 12/1964 | Etzkorn et al. | 279/19.1 |
| 3,454,284 | 7/1969 | Moores, Jr. | 279/19.1 |
| 4,176,991 | 12/1979 | Egli | 279/33 X |
| 4,198,180 | 4/1980 | Schultz | 408/9 |
| 4,260,305 | 4/1981 | Clopton | 408/8 X |

FOREIGN PATENT DOCUMENTS 45-26344 8/1970 Japan ........................ 408/9

Primary Examiner—Z. R. Bilinsky
Attorney, Agent, or Firm—Michael J. Striker

[57] ABSTRACT

The present relates to machine tools, such as hond drills and more particularly to control devices utilized for controlling the speed of the machine tool.

23 Claims, 3 Drawing Figures

CONTROL DEVICE IN A MACHINE TOOL

BACKGROUND OF THE INVENTION

The present invention relates to machine tools, such as hand drills and more particularly to control devices utilized for controlling a speed of the tool machine.

It is known in the art that a predetermined rotational speed of the tool machine is preliminarily adjusted. This adjustment particularly takes place in drilling machines which employ a stage-selecting switch which adjusts a tool drive for drilling in the first stage of rotation with a relatively slow rotational speed. When the stage-selecting switch is pushed on it switches the machine drive to a second stage so that the drive is set up to a predetermined speed. A well-known bridging switch was utilized in the conventional tool machines in a working process where drills should be changed one after another for drilling operations in different materials. Such bridging switch, however, was rather inefficient. The above-described adjustment is attained in the known hand tool machines by means of a relatively small regulator. Such type of adjustment is rather difficult because this regulator is not the most favorable in use during switching on and off the machine. Such regulators are particularly undesirable in hand tool machines since the operator's hand must be additionally used for switching this regulator on and off. In these conditions the manipulation of the handle becomes rather difficult and the hand tool machine is not reliably supported. When it is necessary to change a tool utilized in the tool machine of the conventional type the adjusting operation by means of the above-mentioned regulator becomes specifically complicated. In this respect the disadvantages of the conventional devices can not be overcome particularly when frequent and quick changes of tools to be used are required. In such cases the tool drive utilized in tool machines does not appear to be optimal. The adjustment is not complete, rather difficult and time-consuming. It is to be understood that during the drilling operation not only diameters of holes to be drilled but also some other factors such as material to be treated and the drill's material must also be taken into consideration.

SUMMARY OF THE INVENTION

It is an object of the invention to provide an improved control device for use in hand tool machines.

Another object of the invention is to provide a control device which adjusts a drive of the tool machine to an optimal speed of rotation for each tool to be used which is particularly important for hand tool machines where frequent changes of tools are normally required.

In hand tool machines or do-it-yourself appliances the manufacturing costs concerning the utilization of various tools for one machine should not be high. Therefore the arrangement providing the relatively quick change of tools must be improved in practice. This is attained by means of the present invention.

Still another object of the invention is to provide a control device where an independent stopping of the tool is attained when the tool is released from working pressures.

Yet another object of the invention is to provide a control device which provides the machine tool with a possibility to change the tools quickly and where operation noise during the working breaks may be considerably reduced.

These and other objects of the invention are attained by a control device for tool machines particularly for hand tool machines having a housing, drive means with a rotary spindle, and tool-receiving means, comprising control means adapted to adjust the drive means for a predetermined rotation speed, control element on said tool-receiving means, and transmitting means operatively interconnected between said control element and said control means and operative for transmitting forces exerted on said tool-receiving means during operation to said control means.

The control element may be an elongated sleeve provided with outwardly radially extending flanges having a control face; the control element is arranged to be adjusted in an axial direction.

The transmitting means may include a longitudinal pin slidably positioned within the housing and having a first end portion arranged to engage said control face so that the position of said pin defines the adjustment of said drive means to a predetermined speed of rotation.

The control means may include a motor regulator and a hand switch bridged to said regulator.

The tool-receiving means may be operative for complete releasing of a tool to be used from working pressures exerted on said tool-receiving means during operation.

The tool-receiving means may be arranged to be uncoupled with said spindle when said control means adjust said drive means.

The longitudinal pin has a second end portion.

The control device may further include a connecting plate interconnected with said motor regulator and operatively connected to said second end portion of said pin, said connecting plate being operative for regulating an electric current in said motor regulator when the tool is completely released from working pressures.

The tool-receiving means may include an inner sleeve having a first end portion, a shaped intermediate portion and a second end portion and said spindle may include a longitudinal recess to receive said first end portion.

The control element may be mounted on said second end portion; said second end portion having a recess for accommodating a tool to be used, the diameter of said recess corresponds to a diameter of a tool to be used.

The control device may further include a locking plate mounted on said housing and adapted to be selectively positioned in a locking position on said housing or in a releasing position thereon.

The control device may further comprise a compression spring located in said longitudinal recess and adapted to bias said first end portion in the direction toward a tool to be used.

The control device may further include a mounting element rigidly connected to said spindle and having a bore with an inner surface of a shape corresponding to said shaped intermediate portion and adapted to receive the same for axial movement therethrough.

The elongated sleeve may be extended in an axial direction from a tool to be used so that said sleeve overlaps an open portion of said spindle to thereby prevent the same from pollution.

The mounting element may be threadably connected to said spindle.

The control means may be arranged to control said drive means independently from the position of said elongated pin.

The control means may be arranged to adjust said drive means within the range of working loads from zero to the maximum working loads.

The second portion of said inner sleeve may have an outer thread and said elongated sleeve may have an inner thread so that said elongated sleeve is threadably positioned on said second portion, said outer thread being relatively longer than said inner thread so that the position of said longitudinal sleeve may be adjusted in the axial direction and the optimum controlling position for the operating process may be defined by means of said threads when said control face engages said first end portion of said longitudinal pin, through working pressures acting in an axial direction before the tool-arresting position is reached.

The elongated pin may extend parallel to the axis of rotation of said spindle.

The control device may further include a pin rigidly connected to said connecting plate and outwardly extended therefrom, and a spring mounted in said housing and adapted to bias said connecting plate in an axial direction toward said longitudinal pin so that the latter is urged out of said housing when said control means are set up to a zero loads position.

The locking plate may be pivotally supported on said housing to be moved between said locking and releasing positions to provide an access for adjusting the position of said longitudinal sleeve in the axial direction.

The control device may further include a handle mounted on said housing having a collar.

The handle may be a gripping member encompassing the collar of the housing.

An axle may be provided in the device which is mounted on said housing, said locking plate being arranged to pivot about said axle between said locking and releasing positions.

A spring may be further provided which is mounted on said axle to bias said locking plate in said locking position.

A locking washer may be mounted on the axle to lock the spring on the axle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
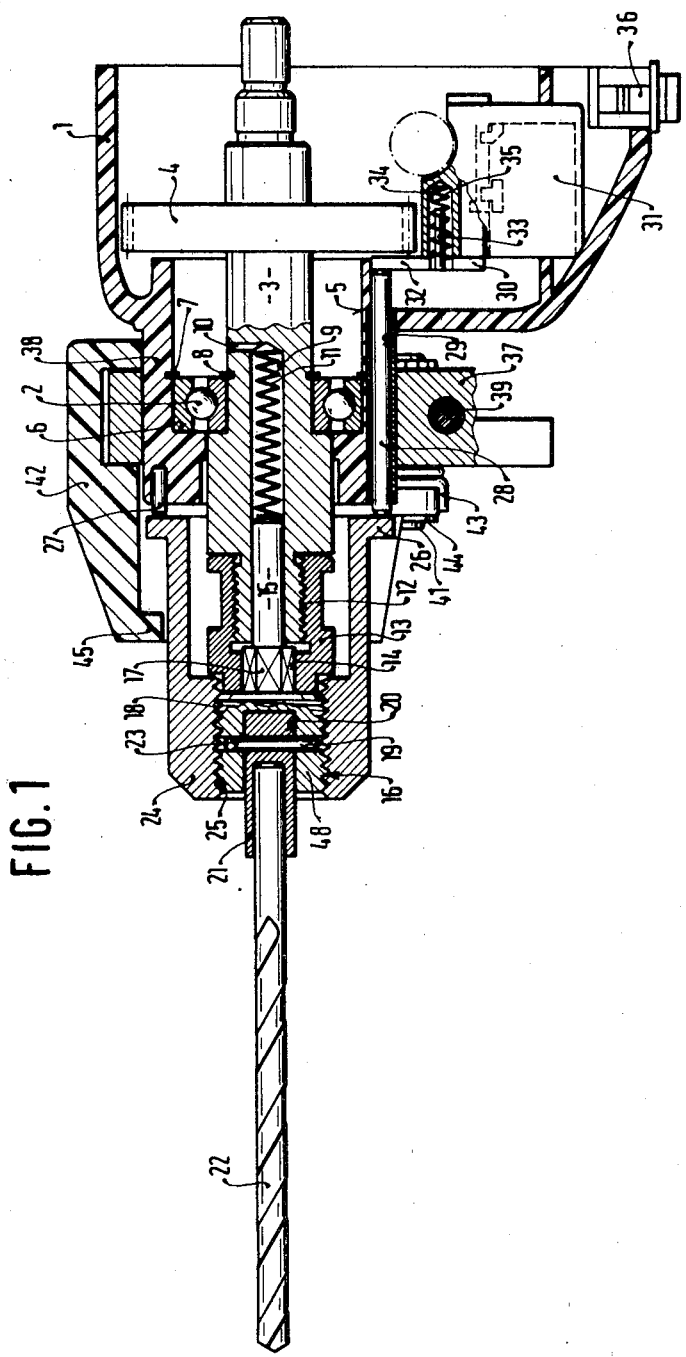
FIG. 1 is an axial sectional view through a tool machine with a control device according to the invention.

Referring to the drawings, and particularly to FIG. 1, a housing or front cap 1 of a drilling machine is illustrated. The part of the hand-operated machine at the right side of the cap 1 is not shown herein. The front cap 1 surrounds a drive spindle 3 carrying a pinion 4 at one end thereof and supported within a ball bearing 2. The ball bearing is mounted in a bore 5 provided in the front cap 1 and is axially secured in the cap from a slidable movement in a section 6 of the bore 5 by means of the corresponding step made in the spindle 3 at one side of the bearing, and by means of keys 7 and 8 arranged at the other side of the bearing. The drive spindle 3 is formed with an internal axial bore 9 which is vented by a radial opening 10 formed at the end thereof. A helical spring 11 is inserted into the bore 9. The drive spindle 3 has a threaded end portion 12 which is normally adapted to receive a tool chuck. In the embodiment presented herein, an adapter 13 is threadedly mounted on the end portion 12 of the spindle 3. A drill 22 or any other suitable tool is rigidly mounted in a tool shaft 21 which in turn is inserted into a recess 20 formed in a tool-receiving sleeve or trunnion 16. The tool-receiving sleeve 16 is formed with a specially formed intermediate shaft portion 17 which is engaged in a prismatic hole formed in a nut portion 14 of the adapter 13.

One end portion of the tool-receiving sleeve 16 is formed as a head 48 having an outer thread 18. A radially extending bore 19 also passes through the tool shaft 21 and head 48. A cylindrical pin 23 is inserted into the bore 19 to interconnect the sleeve 16 with the tool shaft 21 and to prevent their rotation one relative to the other. An outer sleeve 24 is threadably mounted on the thread 18 of the sleeve 16 by means of an inner thread 25 provided in the sleeve 24.

Figure 2:
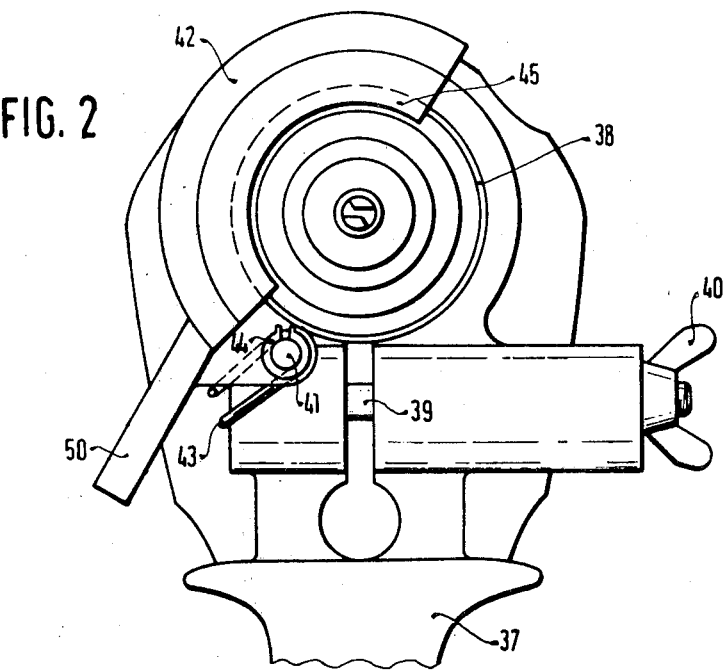
FIG. 2 is a front view of the tool machine illustrated in FIG. 1.
Figure 3:
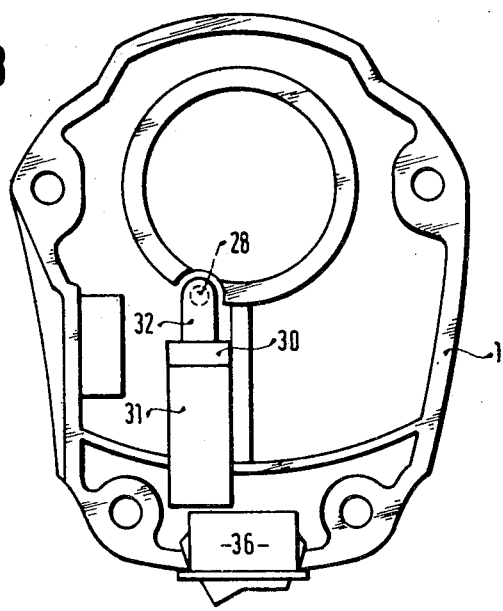
FIG. 3 is a rear view of the tool machine with drive means removed.

The thread 25 extends somewhat longer in the lengthwise direction than the length of head 48 of the tool-receiving sleeve 16 as is clearly seen in FIG. 1. The outer sleeve 24 extends in the axial direction so as to overlap adapter 13 and further extends towards the spindle 3 in order to protect the adapter 13 and the internal part of the spindle from contamination. The sleeve 24 is provided with a flange 26 which is formed at one of the ends of the sleeve and is extended outwardly radially from the outer surface of the sleeve. A pin 27 is rigidly mounted in the cap 1 which has a ball-like front surface axially outwardly projected from the end face of the cap. The end face of the flange 26 is arranged at a predetermined distance from the ball-like surface of the pin 27. A longitudinal pin 28 is slidably mounted in the cap 1. The pin 28 is also formed with a ball-like end portion axially outwardly projected from the end face of the cap 1. The end face of the flange 26 bears against the end portion of the longitudinal pin 28 which serves in the arrangement as a transmitter. The pin 28 is guided in an opening 29 formed in the cap 1 and extended parallel to the longitudinal axis of the spindle 3. The pin 28 extends within the interior of the cap 1 and carries at its second end a movable element 30 of a controller 31 which is also shown in FIG. 3. This movable element 30 is adapted to move in the axial direction via the longitudinal pin 28 which is connected to the element 30 by means of a connecting plate 32. As may be clearly seen in FIG. 1, a bearing opening 34 is formed in the cap 1 or in an element rigidly connected to the cap 1 to receive a compression spring 35 and a pin 33 rigidly secured to the element 30. This compression spring 35 constantly tends to slide out from the opening 34 in the direction towards the longitudinal pin 28. The controller 31 is so constructed that it can control loads exerted on the tool drive during the operation in the range from zero to the maximum possible loads. A switch 36 is provided in the arrangement (FIG. 3) to supply an electric current to the tool drive, which switch also serves to supply the current to the controller 31. A gripping handle 37 is mounted on a collar 38 of the cap 1 to which this handle is clamped. A longitudinal bolt 39 with a butterfly nut 40 mounted at the end thereof serves as clamping means to connect the gripping handle 37 to the cap 1 as clearly seen in FIG. 2. The gripping handle 37 is provided with a pin 41 extending parallel to the longitudinal axis of the tool drive. A locking plate 42 encircling the upper portion of the handle 37 is pivotally supported on the pin 41 and may be pivoted about the collar 38 by means of a handle 50. A spring 43 surrounding the pin 41 is arranged between the handle 37 and the locking plate 42. This spring is prestressed so that the locking plate 42 constantly tends to pivot relatively to the collar 38 of the cap 1. A locking ring 44 provided in the assembly ensures the position of the plate 42 and the spring 43 on the pin 41. The locking plate 42 is provided with a radially inwardly projected flange 45. The plate 42 in its turned or pivoted position when it is clamped near the collar 38 and the handle 37 can overlap the sleeve 24. It is to be understood that the flange 45 is placed in the region of axial movement of flange 26 of the outer sleeve 24. Therefore, the pin 27 and the flange 45 in the locking position of the plate 42 limit the maximum axial play of the sleeve 24. After the sleeve 24 has been adjusted on the tool-receiving sleeve 16 this maximum play is more or less utilized. When the axial position of the sleeve 24 is selected relatively to the sleeve 16, in other words when the sleeve 16 is so positioned relatively to the adapter 13, the maximum axial play is not completely taken up before the flange 26 reaches the ball-like surface of the pin 27. This means that the front face of the flange 26 of the sleeve 24 is adjacent the pin 28 communicated with the controller 31 at relatively low speed of rotations of the drive spindle 3.

As was mentioned above, various machine tools such as a drill or any other suitable tools may be preliminarily installed into the tool-receiving sleeve 16 of the outer sleeve 24. The sleeve 24 may be moved into such axial position on the sleeve 16 that a standard number of revolutions may be adjusted by means of the pin 28 when the latter is in contact with the front face of the flange 26. In order to change a tool to be used in the arrangement of the foregoing type the locking plate 42 is pivoted against the action of the spring 43 relatively to the collar 38 of the cap 1. When the flange 45 is moved away from the region of axial movement of the flange 26, the tool 22 positioned in the sleeve 24 may be taken out. When the above mentioned movement of the sleeve 24 to its contacting position with pin 28 begins, the helical spring 11 biases the end portion 15 of the sleeve 16. In order to insert a new tool (drill or the like) into the sleeve 16 the locking plate 42 must be placed into the corresponding position. The end guiding portion 15 is installed into the bore 9 of the drive spring 3 and pressed against the action of the helical spring 11 unless the flange 45 of the plate 42 engages the flange 46 of the sleeve 24. The released locking plate 42 pivots by action of the spring 43 into its locking position. At this time a number of revolutions of the tool drive for the installed tool is limited by the control arrangement in the range from zero to the optimum number. The length of coupling between the nut portion 14 as well as the adapter 13 and the shaft portion 17 of the tool-receiving sleeve is so adjusted that when the controller 31 is set up to zero number of revolutions both elements being coupled become to move out of engagement. Independently, such adjustment may be obtained when the tool is released from the sleeve 16 before the controller 31 reaches its zero position. This may be attained by means of selection of the respective length of the shaft portion 17 which may be different for each individual tool.

It will be understood that each of the elements described above, or two or more together, may also find a useful application in other types of constructions differing from the types described above.

While the invention has been illustrated and described as embodied in a control device for tool machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a machine tool, particularly for a hand tool machine, including a housing, drive means with a rotary spindle, and tool-receiving means, a control device comprising control means including a motor regulator and a hand switch bridged to said regulator and adapted to adjust the drive means to a predetermined rotation speed; a control element on said tool-receiving means, said control element being an elongated sleeve provided with outwardly radially extending flanges having a control face and arranged to be adjusted in an axial direction; and transmitting means operatively interconnected between said control element and said control means and operative for transmitting forces exerted on said tool-receiving means during operation to said control means, said transmitting means including a longitudinal pin slidably positioned within the housing and having a first end portion arranged to engage said control face so that the position of said pin defines the adjustment of said drive means to a predetermined rotation speed.

2. The tool of claim 1, further including means for coupling said tool-receiving means with said spindle and uncoupling said tool-receiving means from said spindle when said control means adjust said drive means.

3. The tool of claim 1, wherein said longitudinal pin has a second end portion.

4. The tool of claim 3, further including a connecting plate interconnected between said motor regulator and said second end portion of said pin, said connecting plate being operative for regulating an electric current in said motor regulator when the tool is completely released from working pressures.

5. The tool of claim 4, wherein said tool-receiving means include an inner sleeve having a first end portion, a shaped intermediate portion and a second end portion, and said spindle includes a longitudinal recess adapted to receive said first end portion.

6. The tool of claim 5, wherein said control element is mounted on said second end portion of said inner sleeve, said second end portion of said sleeve having a recess for accommodating a tool to be used, the diameter of said recess corresponding to a diameter of a tool to be used.

7. The tool of claim 6, further including a locking plate mounted on said housing, said plate being selectively positioned in a locking position on said housing or in a releasing position thereon.

8. The tool of claim 7, further comprising a compression spring located in said longitudinal recess and adapted to bias said first end portion in the direction of removal of the tool.

9. The tool of claim 8, further comprising a mounting element rigidly connected to said spindle and having a bore with an inner surface of a shape corresponding to said shaped intermediate portion and adapted to receive the same for axial movement therethrough.

10. The tool of claim 9, wherein said elongated sleeve is extended in an axial direction from a tool to be used to that said sleeve overlaps an uncovered portion of said spindle to thereby prevent the same from pollution.

11. The tool of claim 10, wherein said mounting element is threadably connected to said spindle.

12. The tool of claim 11, wherein said control means is arranged to control said drive means independently from the position of said elongated pin.

13. The tool of claim 12, wherein said control means is arranged to adjust said drive means within the range of working loads from zero to the maximal working loads.

14. The tool of claim 13, wherein said second portion of said inner sleeve has an outer thread and said elongated sleeve has an inner thread so that said elongated sleeve is threadably positioned on said second portion, said outer thread being relatively longer than said inner thread so that the position of said longitudinal sleeve may be adjusted in the axial direction and the optimum controlling position for the operating process may be defined by means of said threads when said control face engages said first end portion of said longitudinal pin through working pressures acting in the axial direction before the tool-arresting position is reached.

15. The tool of claim 14, wherein said elongated pin extends parallel to the axis of rotation of said spindle.

16. The tool of claim 15, further including a pin rigidly connected to said connecting plate and outwardly extended therefrom, and a spring mounted in said housing and adapted to bias said connecting plate in an axial direction toward said longitudinal pin so that the latter is urged out of said housing when said control means are set up to a zero loads position.

17. The tool of claim 16, wherein said elongated sleeve overlaps said locking plate in the axial direction.

18. The tool of claim 17, wherein said locking plate is pivotally supported on said housing to be moved between said locking and releasing positions to provide an access for adjusting the position of said longitudinal sleeve in the axial direction.

19. The tool of claim 18, further including a handle mounted on said housing having a collar.

20. The tool of claim 19, wherein said handle is a gripping member encompassing said collar.

21. The tool of claim 20, wherein an axle is provided which is mounted on said housing, said locking plate being arranged to pivot about said axle between said locking and releasing positions.

22. The tool of claim 21, wherein a spring is provided mounted on said axle to bias said locking plate in said locking position.

23. The tool of claim 22, further comprising a locking washer mounted on said axle to lock said spring on said axle.

* * * * *